(12) United States Patent
Tellatin et al.

(10) Patent No.: US 12,363,813 B2
(45) Date of Patent: Jul. 15, 2025

(54) METHOD AND SYSTEM FOR GENERATING LIGHT EFFECTS

(71) Applicant: Ledworks Srl, Milan (IT)

(72) Inventors: Andrea Tellatin, Milan (IT); Marco Franciosa, Milan (IT)

(*) Notice: Subject to any disclaimer, the term of this patent is extended or adjusted under 35 U.S.C. 154(b) by 18 days.

(21) Appl. No.: 17/906,714

(22) PCT Filed: Mar. 22, 2021

(86) PCT No.: PCT/IB2021/052362
§ 371 (c)(1),
(2) Date: Sep. 19, 2022

(87) PCT Pub. No.: WO2021/186420
PCT Pub. Date: Sep. 23, 2021

(65) Prior Publication Data
US 2023/0247744 A1    Aug. 3, 2023

(30) Foreign Application Priority Data

Mar. 20, 2020   (IT) .................. 102020000006025

(51) Int. Cl.
*H05B 47/12*    (2020.01)
*H05B 47/155*   (2020.01)
*H05B 47/19*    (2020.01)

(52) U.S. Cl.
CPC .......... *H05B 47/12* (2020.01); *H05B 47/155* (2020.01); *H05B 47/19* (2020.01)

(58) Field of Classification Search
CPC .... H05B 47/105; H05B 47/115; H05B 47/12; H05B 47/155; H05B 47/19; H05B 47/1965; H05B 47/198; Y02B 20/40
See application file for complete search history.

(56) References Cited

U.S. PATENT DOCUMENTS

| | | | |
|---|---|---|---|
| 9,483,982 B1* | 11/2016 | Reddy | H04N 5/64 |
| 2006/0058925 A1* | 3/2006 | Diederiks | H04N 21/4131 |
| | | | 348/E5.12 |
| 2006/0062424 A1* | 3/2006 | Diederiks | H04N 21/44008 |
| | | | 348/E5.12 |
| 2017/0034894 A1 | 2/2017 | Thorn | |
| 2019/0069375 A1* | 2/2019 | Baker | H04N 21/4394 |

(Continued)

FOREIGN PATENT DOCUMENTS

| | | | | |
|---|---|---|---|---|
| WO | WO-2018158671 A1 * | 9/2018 | | H05B 45/30 |
| WO | 2018224390 | 12/2018 | | |
| WO | WO-2018224390 A1 * | 12/2018 | | |

*Primary Examiner* — Raymond R Chai
(74) *Attorney, Agent, or Firm* — Themis Law; Franco A. Serafini (57) ABSTRACT

A method for generating light effects includes activating at least one lighting device based on a source signal. The lighting device includes a plurality of lighting elements and a control unit connected to the plurality of lighting elements and adapted to individually control the switching on of each lighting element. In particular, the method includes the following steps: acquiring the position of the lighting elements; detecting a source signal; processing the source signal so as to extrapolate at least one given parameter; and activating the one or more lighting elements based on the position thereof and the at least one given parameter extrapolated from the source signal.

9 Claims, 3 Drawing Sheets

(56) References Cited

U.S. PATENT DOCUMENTS

| | | |
|---|---|---|
| 2019/0166670 A1 | 5/2019 | Alfier |
| 2019/0166674 A1* | 5/2019 | Mason ............... H04N 21/8133 |
| 2022/0243877 A1* | 8/2022 | Rodinger ................ F21S 2/005 |
| 2024/0053817 A1* | 2/2024 | Xu ........................ G06F 3/0482 |

* cited by examiner

METHOD AND SYSTEM FOR GENERATING LIGHT EFFECTS

The present invention relates to a method for generating light effects which includes activating at least one lighting device based on a source signal.

Preferably the lighting device comprises a plurality of lighting elements and a control unit connected to said plurality of lighting elements and adapted to individually control the switching on of each of said lighting elements.

The method and system of the present invention preferably relate to lighting devices consisting of strings of lighting elements, comprising a plurality of LEDs, generally used for decorative purposes.

Such LEDs can consist of "addressable LEDs", or "Pixel LEDs" which can be individually controlled by a communication bus. Such LEDs are connected in "wired" configuration, to a control unit capable of receiving input data and sending it out to connect several pixel LEDs in cascade and to control an RGB LED (Red, Green and Blue) integrated with such pixel LEDs.

Therefore, flexible light strips made with Pixel LED cascades are now available on the market which have a connector at one end for connection to a control unit with which the individual Pixel LEDs can be controlled to achieve different light effects.

The diffusion of such light devices has led to the most diverse embodiments and control of such light strips, especially for decorative purposes.

Therefore, the market for light devices requires increasingly complex and amazing decorations and light effects, to the point of offering solutions which go beyond the simple animation generated by the different lighting possibilities (colour, intensity and frequency of switching on) of each individual LED.

The market demand is often to customize the light effects, so that the switching on of the light elements adapts to the surrounding environment, such as the presence of sounds from the environment, the passage of users, the weather, the temperature, etc.

The most widespread example is provided by the combination of lights and music, i.e., the possibility of generating animations and light effects based on a musical piece, which has led to a considerable increase in the demands of light devices which "move" to the rhythm of music.

The effect of the movement seen by the user is obviously generated by the different lighting possibilities of each individual LED, such as the activation frequency of switching on/off or the different colours.

Currently, the state-of-the-art systems include animating the switching on of lights in combination with musical pieces. However, such systems are limited to a modification of the light intensity of the individual LEDs, and do not include the creation of specific lighting effects and animations which faithfully follow the music.

Other methods obtain the combination of light effects and music through devices which light up based on effects pre-programmed and stored within control units, based on musical pieces known a priori, which simply synchronize the start of the light effect with the start of the musical piece.

It is evident that such a solution is limiting for users, as it offers the possibility to select only certain predetermined pieces and above all to obtain a minimum number of light effects.

In the systems and methods known in the art, if the user wants to add more pieces, a modification of the programming, or the number of elements, of the lighting devices is required.

There is therefore a need not met by the methods and systems known in the state of the art to solve the disadvantages set forth above, in particular to provide a lighting device which generates light effects based on any source signal, chosen by a user.

The present invention accomplishes the above objects by obtaining a method as previously described, in which the following steps are included:
 a) acquiring the position of the lighting elements;
 b) detecting a source signal;
 C) processing the signal so as to extrapolate at least one given parameter,
 d) activating the one or more lighting elements.

Furthermore, the activation of the light elements is carried out based on the position thereof and said at least one given parameter extrapolated from the source signal.

The control unit can generate control signals of the lighting elements based on input signals it receives in input.

The method of the present invention therefore includes generating such inputs based on parameters extrapolated from the source signal.

The detected parameter will vary according to the type of source signal, which is used as input for generating light effects.

Using the pixel LEDs described above as lighting elements, the method object of the present invention allows to change the colour of each LED based on the source signal: the colour of each LED is calculated based on the position of the LEDs, the time, the intensity and the extrapolated parameter.

The calculated position is the position of one light element with respect to another, so that the activation of the same takes into account the position of each light element, to create a coordinated effect of each light element which simulates a movement of the lighting device based on the source signal.

The source signal can for example be a signal related to the movement of a user, which is processed for example so as to activate the lighting elements based on the user's movements and/or approach/distancing and/or on the position thereof.

In this perspective, it is possible to include a sensor aimed at detecting the position or movement of the user, also provided in combination with devices wearable by the user, such as bracelets or the like, adapted to record the user's movements.

Alternatively, the source signal can consist of an electrical signal generated following certain weather conditions, or, preferably, external weather forecasting services, available online and usable via the cloud, could be used.

For example, a rain capture device can be provided, to cause the lighting elements to be activated so as to simulate rain, i.e., rhythmically with the fall of rain.

According to a preferred embodiment, the source signal is an audio signal, such as a musical piece.

In this case, the processing of the musical piece aims to obtain typical audio parameters of such signals, such as volume increase/decrease, highs, lows, beats, pauses, etc., from such a musical piece so as to vary the lighting based on such parameters.

Preferably the detected parameters can be:

BPM

Lows (Beat Moment, Width, Beat Length, Silence Moment, Silence Length, Volume, Peak Moment, Pause Moment)

Mediums (Beat Moment, Width, Beat Length, Silence Moment, Silence Length, Volume, Peak Moment, Pause Moment)

Highs (Beat Moment, Width, Beat Length, Silence Moment, Silence Length, Volume, Peak Moment, Pause Moment).

It is possible to include extrapolating one or a combination of any audio parameters.

Purely by way of example, in addition to those listed, it is possible to include parameters related to the classification of the musical piece by inferring the genre (rock, classic, electronic, etc.) or "mood" (energetic, relaxing, cheerful, frenzied, etc.) thereof.

The association between the level of light intensity, type of colouration and frequency of activation, and parameters of the musical piece, can be carried out in a manner completely similar to the systems and methods known in the state of the art, with the difference that it is not limited to a piece, but to an infinite number of pieces, precisely by virtue of the extrapolation of such parameters.

Furthermore, with respect to the systems and methods known in the state of the art, the present invention allows to generate new light effects based on the source signal and not simply modifying the light intensity of the lighting elements.

As will be described below, in fact, each light effect includes a combination of attributes, linked to the lighting state of each light element: the method object of the present invention therefore includes modifying the light effects through an adjustment of such attributes based on the parameter(s) extrapolated from the source signal.

The term "attribute" refers to a property of the lighting element, which, in the specific case of the method in question, is automatically varied depending on the parameters obtained from the audio signal: a configuration component of the effect is responsible for translating the parameters extracted from the signal processing in variation of the attributes.

It will therefore be sufficient to establish the rules whereby, for example, an increase in volume can be matched by an increase in light intensity, or a simultaneous activation of all the lighting elements, to generate light effects which simulate a movement of the lighting device to the rhythm of music, regardless of the piece chosen by the user.

By knowing the position of each lighting element, it is possible, for example, to draw geometric shapes which change according to the extrapolated parameters: moving geometric shapes are obtained, always in time with the music.

In fact, one of the peculiarities of the method object of the present invention is the effect generated by a plurality of light elements, which are located at a short distance from each other.

In fact, changing the lighting states of each light element does not create a "punctual" effect, but an "orchestral" and coordinated effect, aimed at simulating a movement of the light elements.

In this perspective, the calculation of the position is a fundamental step, as the application of the relative position of the individual lighting elements to make them react in concert with respect to the processed musical signal.

The method object of the present invention further allows to generate parametrized light effects.

Obviously the reproduction of the audio signal and the activation of the lighting elements is carried out synchronously.

Advantageously, in fact, a step is included of generating a synchronization signal, aimed at identifying the beginning of the reproduction of the audio signal and the activation of the light elements.

The synchronization between the reproductions obviously plays a fundamental role for the success of the light effect.

Preferably, in the method object of the present invention, the synchronization occurs continuously and in real time: updates of the parameters extracted from the source signal are sent continuously and the lighting device control units are synchronized accordingly on the last received signal.

In fact, as will be apparent from the illustration of some example embodiments, time is a particularly relevant parameter on which the processing of the audio signal can be based.

In particular, in the case of an audio signal, it is possible to locate the beat-per-minute (BPM) value of the song and then generate animations which follow the rhythm to give visual correspondence to the music which is listened to. One of the crucial aspects of the previously described method, which allows to generate new light effects based on the parameter(s) extrapolated from the source signal, is to include the step of acquiring the position thereof.

The acquisition step can therefore include that the lighting elements are arranged according to a predetermined scheme, so that it is not necessary to calculate and locate the position of each, but to use positions known a priori.

According to a preferred embodiment, the method of the present invention is not merely to acquire, but to identify the position of each lighting element.

As will be described below, the relative position of all the lighting elements is calculated, i.e., of one lighting element with respect to another and not the position of the lighting elements with respect to the source signal generation point.

In practice, the determination of the relative position between the lighting elements is functional to the "orchestral" representation of the effect as a result of the processing.

Step a) of detecting the position is therefore an "active" step, which includes calculating and identifying the position of each lighting element, the positioning of which is not known a priori.

Preferably such a step is carried out through a user unit, such as a smartphone or the like.

The identification of the position can be obtained as described in WO2017/115326, the contents of which are to be considered an integral part of the present patent application.

The possibility of mapping each individual lighting element allows the method object of the present invention to create dynamic and parametrized light effects, which not only include a variation in the light intensity of the lighting elements, separately and independently controlling each individual lighting element to obtain any type of light scenography.

As described above, a typical example can be geometric shapes, which vary and "move" based on the source signal, giving a visual meaning to said signal.

The identification of the position, in combination with obtaining new light effects, is particularly advantageous in the case of the presence of multiple lighting devices.

In fact, several lighting devices can be included each with the control unit thereof, so that the control units communicate with each other in wireless mode.

In this case the step of activating the lighting elements must include a step of synchronizing the lighting devices.

All the control units, and preferably also the source signal playback device, are temporally synchronized.

The temporal synchronization can be accomplished either independently using an external sync source (e.g., an NTP server) or by other master/slave or peer-to-peer local area network temporal synchronization methods.

When necessary, the control units of each lighting device synchronize with each other (for example, to choose the current effect to display).

Such a configuration is described in WO2018/158671, the contents of which are to be considered an integral part of the present application.

According to a refinement aimed at further improving the scenic effect, the method includes a step of detecting parameters of the environment in which the lighting elements are positioned.

For example, it is possible to detect the light level in the environment with special instruments and consequently vary the activation/colouration of the light elements.

Another parameter could be the noise of the environment, including a microphone which records an audio signal related to the surrounding environment.

This audio signal can also be processed for the extrapolation of the aforementioned parameters, so as to modify the activation of the light elements based on the combination of the source signal chosen by the user and the ambient noises.

It is therefore evident that the method object of the present invention, as well as the system which will be described below, can be used both for musical pieces and for audio signals, as well as for any source signal, so that the lighting device recreates a real atmosphere, capable of amplifying the user's enjoyment also while listening to or viewing audio signals.

In practice, the source signal is processed so as to extrapolate the parameters described above, taken individually or in combination, and the lighting elements are activated/deactivated/varied based on the position and the source signal, and therefore generating the animation.

According to an embodiment of the method of the present invention, a step is included of connecting the user unit and the lighting device to a remote database containing a plurality of audio signals.

The remote database can for example be provided on "cloud" platforms, in which not only audio/video signals but also files processed with the parameters of interest associated with each audio/video signal are stored.

Such a feature, in addition to speeding up the synchronization between audio/video signal and light effects, also facilitates the production and sale of the system, which will be described later.

In fact, it is possible to use as input of the lighting device the file processed and associated with a musical piece, which is not subject to the payment of royalties deriving from the copyright of the audio signal.

In view of the advantageous aspects described above with regard to the method, the present invention also relates to a lighting system comprising at least one lighting device comprising a plurality of lighting elements and a control unit connected to the plurality of lighting elements, adapted to individually control the switching on of each of said lighting elements.

A processing device is further present adapted to detect a source signal and configured to process the signal so as to extrapolate at least one given parameter.

In particular the control unit and/or processing device are configured to implement the steps of the method described above.

For example, if the source signal is related to the movements of a user, it is possible to include that the processing device is provided with an accelerometer.

Alternatively, in the case of an audio signal, it is possible to include that the processing device has a microphone for the signal acquisition and a processing unit for extrapolating the parameters of interest from the audio signal.

The lighting device can be made according to the features described in WO2017/115326 and WO2018/158671.

The system object of the present invention can further include a user unit, configured to communicate with the control unit and to identify the position of the lighting elements.

The user unit can consist of any device, such as a smartphone, tablet, computer, or the like.

According to an embodiment, the system comprises a remote unit comprising a database for storing a plurality of audio signals, such that the control unit and/or the processing unit and/or the user unit communicate with the remote unit.

As anticipated, the remote unit can consist of a cloud platform, so as to allow objects separate from each other and without a physical connection, such as the lighting device, the processing device and the user unit, to communicate, even automatically, so that a user can select a musical piece and automatically start a light effect which "moves" to the rhythm of such a piece.

For example, some audio streaming services provide a cloud service which returns the features of the audio signal associated with a piece, such as Spotify, available at https://developer.spotify.com/documentation/web-api/reference/#endpoint-get-audio-features These and other features and advantages of the present invention will become clearer from the following description of some exemplary embodiments illustrated in the attached drawings in which:

It is specified that the figures annexed to the present patent application indicate some embodiments of the method and system object of the present invention to better understand the specific advantages and features thereof.

Such embodiments are therefore to be understood for the purpose of non-limiting explanation of the inventive concept of the present invention, namely to obtain a lighting method and a system, which include generating light effects based on a source signal, regardless of the chosen source signal, so as to obtain a "movement" effect of the lights which recalls and in some way gives shape to the source signal.

Furthermore, the attached figures relate to the example embodiment of an audio signal for simplicity of presentation, but, as anticipated, it is evident how the method can be related to any source signal.

Figure 1A:
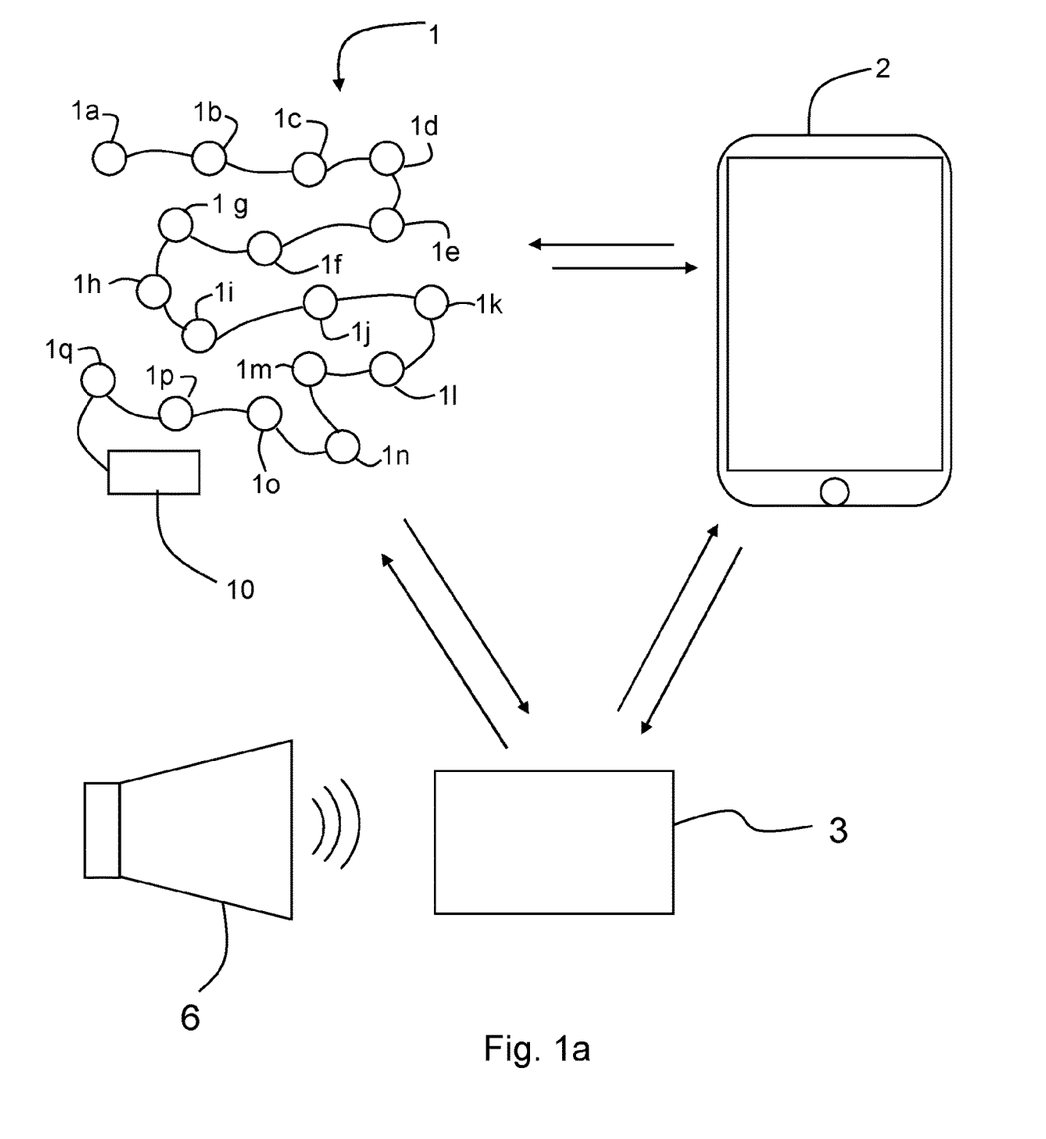
FIG. 1a shows a concept diagram of an embodiment of the lighting system object of the present invention.

With particular reference to FIG. 1a, the system object of the present invention includes a lighting device 1, a user unit 2 and a processing device 3 adapted to detect a source signal and configured to process said signal so as to extrapolate at least one parameter.

The lighting device consists of a string of lighting elements, in particular of addressable LEDs 1a-1q, electrically connected to each other and each independently controlled by a control unit 10.

The control unit 10 can communicate with the user unit, a smartphone 2, so that the activation of the LEDs 1a-1q can be controlled through the smartphone 2.

Furthermore, the communication between the control unit 10 and the smartphone 2 allows to identify the spatial position of each individual LED 1a-1q, according to the methods described above.

Furthermore, the relative positions of the individual lighting elements 1a-1q are transferred through the user unit 2 to the control unit 10 and based on these positions, i.e., the layout of the lighting elements, it is possible to ensure that what is displayed reacts as a single entity in reaction to the source signal.

The device 3 can for example consist of audio signal acquisition means, such as a microphone, and which has a processing unit for processing an audio signal generated by an audio signal generation source 6, such as TV, PC, radio, hi-fi system or the like.

As will become apparent from the following description, the device 3 can be integrated within the control unit 10.

The smartphone 2 and the control unit 10 are then connected to the processing device 3, so that the processing device 3 processes the music and communicates the parameters of the music to the control unit 10 in real time.

From what has just been described, it is clear that the smartphone 2 is not necessary for the operation of the system, but functional, as will be seen later, to identify the position of the lighting elements 1a-1q.

In the case where the location is known a priori, it is sufficient that the positioning diagram of the lighting elements is stored, either within the control unit 10 or within the processing device 3, to allow the operation of the system.

The processing device 3 processes the audio signal and communicates the one or more extrapolated parameters to the control unit, which modifies the activation of the lighting elements 1a-1q based on the parameters and on the position thereof.

If, on the other hand, it is necessary not only to acquire, but to identify the position of the lighting elements, the presence of the smartphone 2 is necessary, according to the methods described above.

It is also evident that the functionalities of the processing device 3 can be integrated within the smartphone 2.

Figure 2:
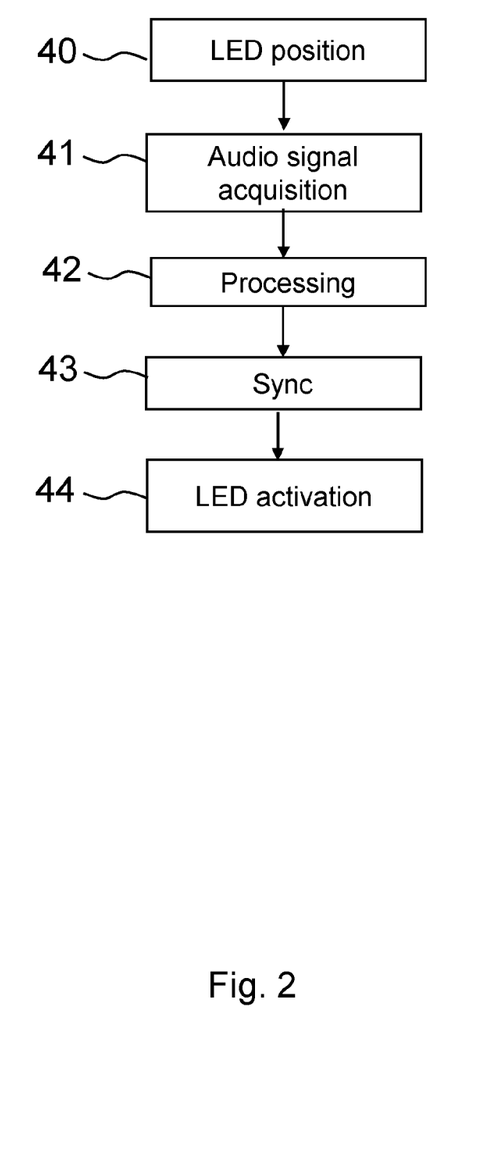
FIG. 2 shows a flow chart intended to represent a possible embodiment of the method for generating light effects object of the present invention.

Regardless of the configuration chosen, the system preferably operates according to the diagram shown in FIG. 2.

First there is an acquisition of the position of the lighting elements 1a-1q, step 40.

As anticipated, step 40 can occur with or without the smartphone 2.

Advantageously, the position acquisition step 40 is the first step to be performed, since, once the lighting elements 1a-1q are arranged, the position does not change over time, while it is possible that the source signal from which the one or more parameters which allow to modify the activation of the elements 1a-1q are extrapolated can vary.

In order to simplify the procedure for detecting the position of the light elements, the user device comprises a camera for capturing a sequence of images of the environment in which the lighting device is positioned.

The control unit is instead configured to implement a system configuration step in which it activates each lighting element according to a respective switching on sequence dictated by the user device, while the user device is configured to analyse a sequence of images first provided to the control unit and then acquired during the system configuration step to determine the spatial position of each lighting element and to send information related to the spatial position of each lighting element to the control unit.

Once the position is acquired, the next steps 41-44 can be repeated recursively, each time a new audio signal is acquired from the processing device 3.

Subsequent to step 40, the device 3 acquires a musical piece emitted by the source 6, step 41, after which such a piece is processed so as to extrapolate one or more parameters.

As anticipated, it is of course possible to envisage other acquisition methodologies, as well as different sources, such as a file, music streaming or Bluetooth connection with an external playback device.

The result of the processing step 42 is a stream of parameters related to certain features of the musical piece, such as volume, highs, lows, frequencies, pauses, beats, etc., transferred in real time from the device 3 to the control unit 10.

Alternatively, if the processing step 42 is performed on a musical piece a priori, it is possible to include that the result of the processing step 42 is a file reporting some features of the musical piece.

The processing step 42 can preferably be carried out using specific software and/or algorithms known in the art.

Advantageously, such software processes the song and extrapolates a curve of parameters associated with a temporal base as long as the piece.

Therefore, the processing of the acquired signal allows the extraction of one or more audio parameters and can occur both through classical signal processing algorithms and with machine learning methods.

As described, it is alternatively possible to include that the processing step does not extrapolate the parameters, but the system can already know the value of such parameters, based on a previous processing or as already provided and available a priori knowing the piece being played back.

As anticipated, additional software loaded on the smartphone 2 allows to detect the position of each LED 1a-1q.

Through the control unit 10, the lighting device 1 acquires the parameter curve associated with the musical piece chosen by the user and as soon as the song is played, a synchronization signal is generated, step 43, which starts the activation of the LEDs, step 44.

The activation of the LEDs occurs based on the parameters of the piece, so that the expected graphic effect is the one in which the lighting device 1 moves following the rhythm of the piece and/or lights up in order to amplify and emphasize the pleasantness of the music which the user is listening to.

Preferably, the light effect is obtained through a parametric generator, capable of reproducing geometric shapes (lines, circles, polygons, etc.) knowing the positions of the LEDs or otherwise alternately lighting sets thereof. The parameters inside the generator are changed based on the parameter and/or parameters extrapolated from the musical piece after the processing step.

More precisely, the processing step 42 includes translating the parameters extracted from the signal into light effect control parameters.

It should be specified that each effect generated by the light elements exposes a part of configurable attributes which characterize it, such as angle, zoom, speed, intensity, coordinate shift, etc.

In particular, each effect is actually composed of a combination of basic elements defined "patterns", each with attributes thereof, which are bound together spatially and temporally.

From this it can be seen how the determination of the spatial position of each lighting element with respect to the other lighting elements is a fundamental factor in obtaining light effects which "move" to the rhythm of music.

The parameters extracted from the acquired signal can be used by the system to change the currently displayed effect.

For example, if the system recognizes that a track is of a different genre than a previously acquired piece (e.g., dance or classical) it may decide to apply some effects which are suitable for that type of genre.

The effects to be displayed can also be selected based on preferences specified by the user. For example, the user can indicate a preference for "effects suitable for energizing music" or "effects suitable for relaxing music"—the system will automatically change the selected effect by choosing from a set of effects with the desired features.

The system can decide to switch from one effect to another both when changing tracks and when playing the track back. The most appropriate times to carry out the change are always determined based on the input parameters obtained from the processing step.

The system can also dynamically vary the attributes of an effect, e.g., it can change the colour palette of each n beat, vary the zoom in relation to signal strength, vary the angle or speed based on the bpm.

The relationship between the parameters extracted from the signal and the value of the attributes of an effect is expressed through a configuration which is associated with the effect itself.

Such a configuration expresses the behaviour, i.e., the "musical reactivity", of the effect. Different types of behaviours can then be associated with identical visual elements. The reactivity component associated with an effect is typically expressed as a function which associates input, status, and time parameters with the attributes to be set for the effect.

For example, a visual representation showing coloured bands can be associated with different reactive behaviours such as:

increasing the rotation angle for each n beats detected, so as to obtain a "rotation" effect of the bands changing the zoom proportionally to the intensity of the audio signal varying the colour with a frequency proportional to the bpm.

Combinations of the changes listed above can clearly be applied to achieve more complex behaviours.

Regarding the rendering of the light effect, i.e., the execution of such light effects, the method object of the present invention includes that for each LED $1a$-$1q$, the selected effect known, the attributes set and the position of the LEDs calculated in the previous step, the colour to be set is determined.

From what is described in relation to FIG. 2, the user can simply choose a piece to be played back at the source 6, after which the method object of the present invention includes activating the LEDs to the rhythm of music appropriately to the piece being played back.

Obviously it is possible to include the same behaviour in the case of multiple pieces in sequence, such as playlists or the like, simply by creating different files or a single file of the duration of the entire playlist.

The processing step 42 can be performed only once, after which the various files obtained can be stored within specially included storage units or within the smartphone 2 or within the control unit 10 or the processing device 3.

The musical piece can also be played back by the smartphone 2.

It is evident that the system described above can include a plurality of lighting devices.

In this case it is preferable to identify the position of each individual lighting device with respect to the other lighting devices.

Referring to an enclosed environment, such as a room, it will be preferable to identify which lighting devices are located at the floor, side walls or ceiling, so as to divide the animation and light effects to be generated not only by the number of lighting devices, but also according to a spatial order thereof.

Alternatively, by virtue of the method steps described above, it is clear that the semantic interpretation of the place where the lighting devices are located is not necessary, being based exclusively on the knowledge of the relative spatial location thereof in 2D or 3D.

As anticipated, a similar configuration is described in WO2018/158671, in which a group of LED strips is included, each controlled by a control unit thereof.

WO2018/158671 describes how to synchronize the LED strips and how to manage the generated light effects divided for each individual LED strip.

The device 3 could then function as a gateway and send the parameters of interest extrapolated from the piece to the lighting devices belonging to the group.

Furthermore, the device 3 would be associated with the group of LED strips and could therefore calculate the parameters related to the source in real time and provide them in real time to all the nodes, i.e., to the control units 10 which belong to the group associated therewith.

The individual nodes will process the parameter in real time to generate a light effect not only as a function of the parameter, but also considering being part of a group, thus generating a part of the light effect.

In fact, the control unit of each LED $1a$-$1q$ knows the layout of the LEDs (configured in an earlier step), thus, in the case of multiple lighting devices (i.e., multiple control units) within the system, each knows the layout part thereof.

Figure 1B:
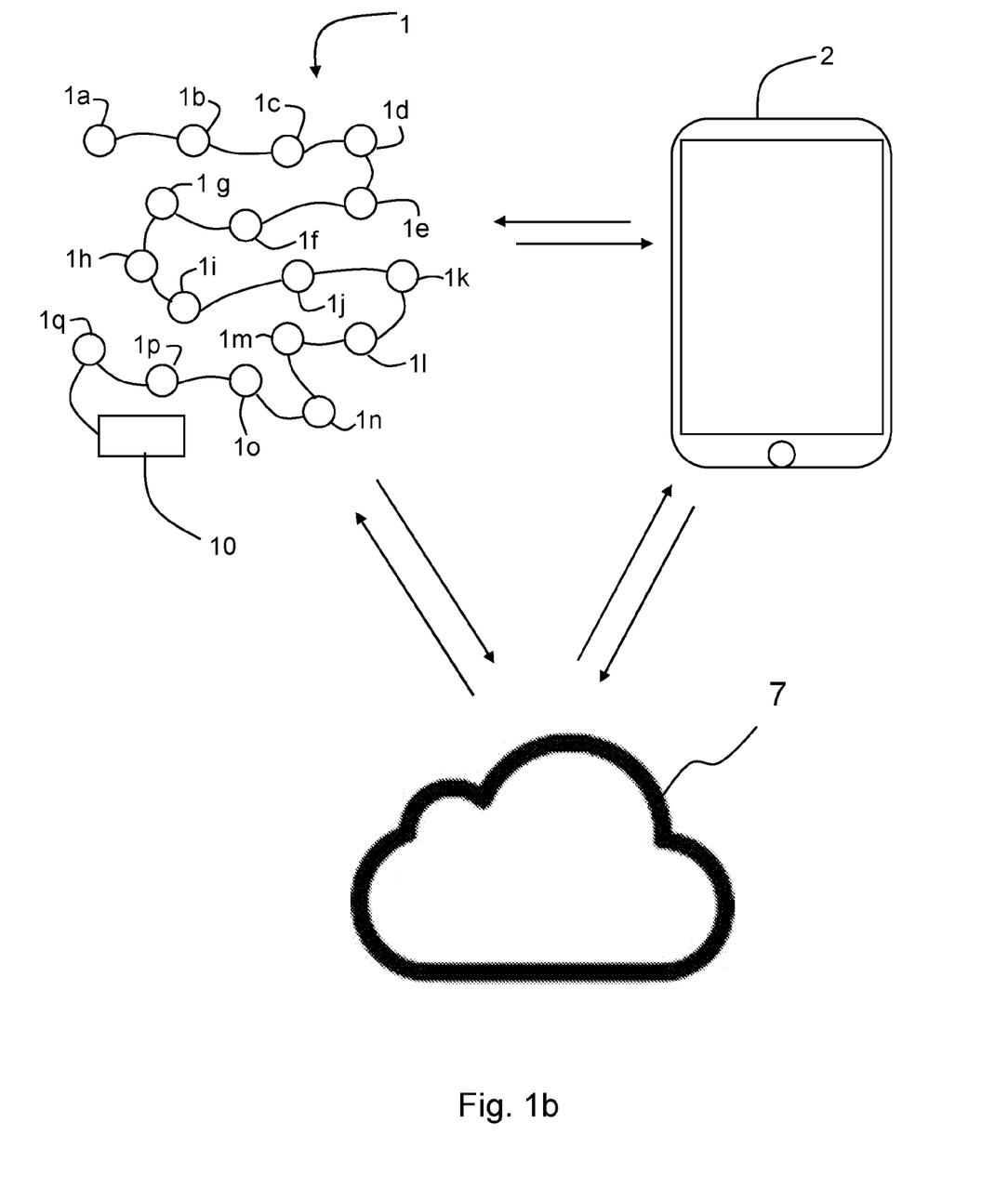
FIG. 1b shows a concept diagram of a further embodiment of the lighting system object of the present invention.

It is possible to include a completely similar operation of an embodiment of the system illustrated in FIG. $1b$, in which a remote unit is included, consisting of a cloud platform 7, in which a plurality of audio signals, in particular a plurality of musical pieces, are stored.

In this case, the system functions exactly like the system described in FIG. $1a$, with the difference that there is not a step of acquiring the musical piece, but of selecting the musical piece and subsequent processing, as described above, which is carried out by the user device 2 in place of the device 3.

In fact, the specific processing software can be loaded on the smartphone 2 and/or the remote unit 7 and/or the control unit 10.

Based on what is described and illustrated in FIG. $1b$, the cloud platform 7 can also not be present, if the music is stored within the smartphone 2, without modifying the method steps described above.

In the particular case of FIG. $1b$, on the other hand, the user, through the smartphone 2, chooses the musical piece present on the cloud platform and as soon as the song is played back, the LEDs $1a$-$1q$ are activated.

The invention claimed is:

1. A method for generating light effects comprising:
activating a lighting device based on a source signal,
said lighting device comprising a plurality of lighting elements electrically connected to each other, and a control unit connected to said plurality of lighting elements and adapted to individually control a switching on of each of said lighting elements,
wherein activating said lighting device based on said source signal comprises:
capturing a sequence of images of an environment where said lighting device is positioned;
analyzing said sequence of images and determining a spatial position of each of the lighting elements in said lighting device in relation to one another;
detecting said source signal;
processing said source signal so as to extrapolate at least one given parameter;
generating a synchronization signal that identifies a beginning of said source signal; and
activating one or more lighting elements of the plurality of lighting elements upon receipt of the synchronization signal to generate light effects,
wherein activating the one or more lighting elements comprises activating the one or more lighting elements based on a position of each of the one or more lighting elements and on said at least one given parameter extrapolated from said source signal, and
wherein activating the one or more lighting elements further comprises generating the light effects based on preferences selected by a user, the user being provided with a plurality of different preferences for a same source signal.

2. The method according to claim 1, further comprising a user unit, and wherein acquiring a position of the lighting elements comprises identifying the position of the lighting elements by said user unit.

3. The method according to claim 2, further comprising a step of connecting said user unit and said lighting device to a remote database containing a plurality of source signals.

4. The method according to claim 1, wherein there is a plurality of lighting devices, and wherein activating the one or more lighting elements includes synchronizing said plurality of lighting devices.

5. The method according to claim 1, wherein said source signal is an audio/video signal, and wherein activating said one or more lighting elements comprises activating said one or more lighting elements synchronously with respect to a playback of said audio/video signal.

6. The method according to claim 1, further comprising a step of detecting parameters of an environment in which the plurality of lighting elements are positioned, the parameters of the environment comprising light and noise levels in the environment.

7. A lighting system comprising:
said lighting device comprising said plurality of lighting elements, and said control unit connected to said plurality of lighting elements and adapted to individually control said switching on of each of said lighting elements;
a user device configured to capture said sequence of images of said environment where said lighting device is positioned and to analyze said sequence of images to determine said spatial position of each of said lighting elements in said lighting device; and
a processing device adapted to detect said source signal and configured to process said source signal so as to extrapolate at least one given parameter,
wherein the control unit and/or said processing device is configured to implement steps of said method according to claim 1.

8. The lighting system according to claim 7, wherein the lighting device is one of a plurality of lighting devices connectable to each other in wireless mode.

9. The lighting system according to claim 7, further comprising a remote unit is included that comprises a database for storing a plurality of audio/video signals, said control unit, said processing device, and/or said user device communicating with said remote unit.

* * * * *